United States Patent
Yu et al.

(10) Patent No.: US 8,625,246 B2
(45) Date of Patent: Jan. 7, 2014

(54) DSL PROTECTION CIRCUIT

(75) Inventors: Pingfang Yu, Shenzhen (CN); Yuesheng Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/435,821

(22) Filed: Mar. 30, 2012

(65) Prior Publication Data

US 2012/0188677 A1    Jul. 26, 2012

Related U.S. Application Data (63) Continuation of application No. PCT/CN2010/079892, filed on Dec. 16, 2010.

(30) Foreign Application Priority Data

Feb. 9, 2010   (CN) .......................... 2010 1 0107550

(51) Int. Cl.
*H02H 9/02* (2006.01)

(52) U.S. Cl.
USPC ........................................ 361/93.9; 361/93.8

(58) Field of Classification Search
None
See application file for complete search history.

(56) References Cited

U.S. PATENT DOCUMENTS

| | | | |
|---|---|---|---|
| 4,625,254 A | | 11/1986 | Fahlen |
| 4,823,383 A | * | 4/1989 | Cardot et al. ................. 379/412 |
| 6,137,880 A | * | 10/2000 | Bella ........................ 379/399.01 |
| 6,144,735 A | * | 11/2000 | Bella ........................ 379/399.01 |
| 6,456,650 B1 | * | 9/2002 | Cheng et al. .................. 375/222 |
| 6,628,783 B1 | * | 9/2003 | Van Wonterghem ......... 379/416 |
| 6,853,724 B2 | * | 2/2005 | Wang ....................... 379/387.02 |
| 6,895,089 B2 | * | 5/2005 | Wang ....................... 379/387.01 |
| 7,787,614 B2 | * | 8/2010 | Duran et al. ............. 379/413.02 |
| 8,179,655 B2 | * | 5/2012 | Wedley ........................ 361/119 |

(Continued)

FOREIGN PATENT DOCUMENTS

| | | |
|---|---|---|
| CN | 2807641 Y | 8/2006 |
| CN | 1897612 A | 1/2007 |

(Continued)

OTHER PUBLICATIONS

International search report for corresponding PCT application No. PCT/CN2010/079892, dated Mar. 24, 2011, and an English translation thereof, total 17 pages.

(Continued)

*Primary Examiner* — Rexford Barnie
*Assistant Examiner* — Angela Brooks
(74) *Attorney, Agent, or Firm* — Conley Rose, P.C.; Grant Rodolph; Nicholas K. Beaulieu (57) ABSTRACT

The embodiments of the present application provide a DSL protection circuit, including: a DSL and POTS broadband and narrowband mixed signal port, a narrowband POTS port, and a splitter, where the DSL and POTS broadband and narrowband mixed signal port is connected to the narrowband POTS port through the splitter, and a line on which an input end or output end of the splitter is cascaded with a restorable current-limited component for limiting abnormal current; a line on which the splitter and the restorable current-limited component are cascaded is connected in parallel with a voltage-limited component for bypass conduction of the splitter; a line on which the DSL and POTS broadband and narrowband mixed signal port is or a line on which the narrowband POTS port is cascaded with an overcurrent fuse component.

20 Claims, 7 Drawing Sheets

(56) References Cited

U.S. PATENT DOCUMENTS

| | | | |
|---|---|---|---|
| 8,310,081 B2 * | 11/2012 | Yelland et al. | 307/1 |
| 2002/0105941 A1 * | 8/2002 | Corvino et al. | 370/352 |
| 2003/0112960 A1 | 6/2003 | Wang | |
| 2007/0116257 A1 * | 5/2007 | Duran et al. | 379/413 |
| 2009/0244800 A1 * | 10/2009 | Wedley | 361/119 |

FOREIGN PATENT DOCUMENTS

| | | |
|---|---|---|
| CN | 201114330 Y | 9/2008 |
| CN | 201160222 Y | 12/2008 |
| CN | 201243201 Y | 5/2009 |
| EP | 0735734 A2 | 10/1996 |
| EP | 0967735 A1 | 12/1999 |
| EP | 1744531 A2 | 1/2007 |
| EP | 2071815 A1 | 6/2009 |
| JP | 2009284581 A | 12/2009 |
| WO | 03052958 A1 | 6/2003 |

OTHER PUBLICATIONS

Foreign Communication From a Counterpart Application, European Application No. 10845591.6, Extended European Search Report dated Feb. 18, 2013, 6 pages.

Foreign Communication From a Counterpart Application, PCT Application PCT/CN2010/079892, English Translation of Written Opinion dated Mar. 24, 2011, 4 pages.

Foreign Communication From a Counterpart Application, Chinese Application No. 201010107550.5, Chinese Office Action dated Mar. 25, 2013, 6 pages.

Foreign Communication From a Counterpart Application, Chinese Application No. 201010107550.5, Partial English Translation of Chinese Office Action dated Mar. 25, 2013, 4 pages.

* cited by examiner

DSL PROTECTION CIRCUIT

CROSS-REFERENCE TO RELATED APPLICATION

This application is a continuation of International Application No. PCT/CN2010/079892, filed on Dec. 16, 2010, which claims priority to Chinese Patent Application No. 201010107550.5, filed on Feb. 9, 2010, both of which are hereby incorporated herein by reference in its entireties.

FIELD OF THE APPLICATION

The present application relates to the circuit technology field, and in particular, to a DSL protection circuit.

BACKGROUND OF THE APPLICATION

With development of the access network, different access technologies thrive, including ADSL2+ (Asymmetric Digital Subscriber Line, asymmetric digital subscriber line) and digital subscriber line (Digital Subscriber Line, shorted as DSL hereinafter) of VDSL2 (Very-high-bit-rate Digital Subscriber loop, very-high-bit-rate digital subscriber loop) that are considered as the most advanced and operable mainstream technologies. The DSL technology uses the existing entering-home copper strand wire as the medium and provides different bandwidth through different modulation modes to implement access of subscribers with different rates and solve the problem of last-mile access.

Figure 1:
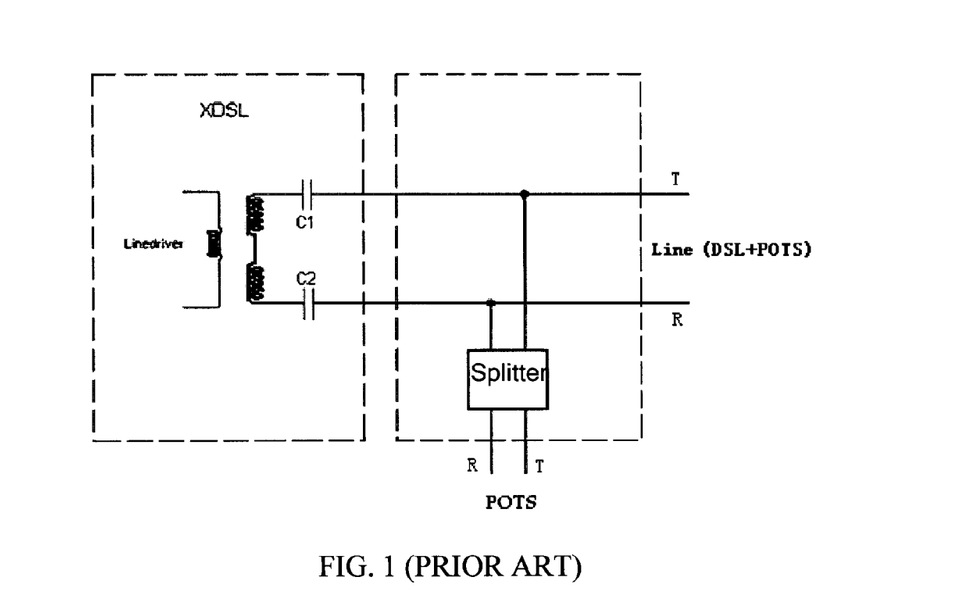
FIG. 1 is a schematic structural diagram of a DSL protection circuit.
Figure 2:
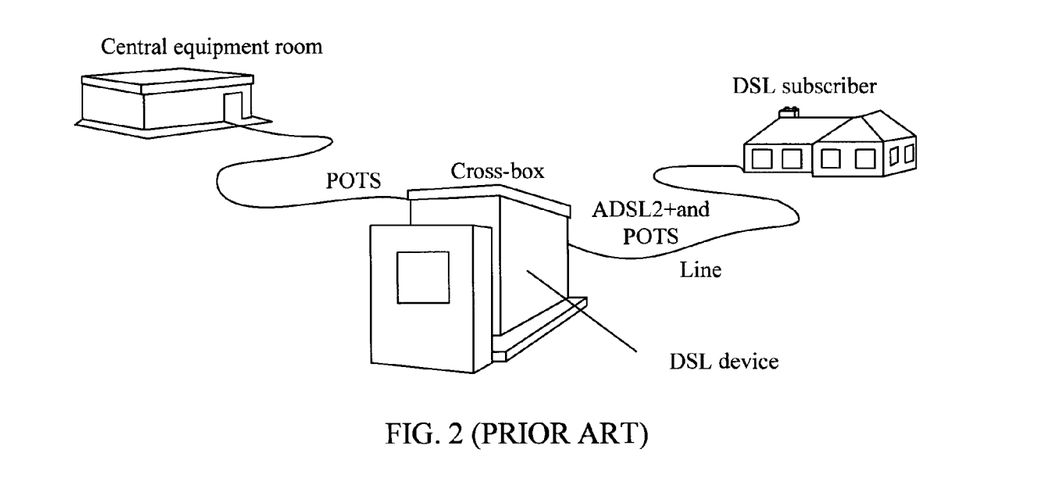
FIG. 2 is a schematic diagram of line connection of a DSL device to a central equipment room and a user.

Copper cables for transmitting DSL signals are generally laid at an outdoor exposed environment at a length of several miles and are easy to be affected by overvoltage and overcurrent due to lightning strike, surge, and power line faults. Therefore, a protection design is required for subscriber ports of an access device. A general xDSL interface circuit is shown in FIG. 1. On the xDSL circuit, a transformer and a high-voltage capacitor are available for the bandwidth part, isolation and protection can be almost implemented. The major problem is about protection of a splitter. In an actual application, generally, a DSL device is installed in an outdoor cabinet, a plain old telephone service (Plain Old Telephone Service, shorted as POTS hereinafter) wire is connected to a central equipment room, and a Line (port of mixed DSL signal and POTS signal) wire is connected to a DSL subscriber's home, as shown in FIG. 2. As the POTS wire and the Line wire are connected to different places, the following situation may occur: A two-wire short-circuit fault or grounding fault occurs on one end and lightning strike, power line induction, or contact occurs on the other end; at this time, overvoltage is added to two ends of the splitter or high current passes the splitter, and in this case, the splitter is damaged.

Figure 3:
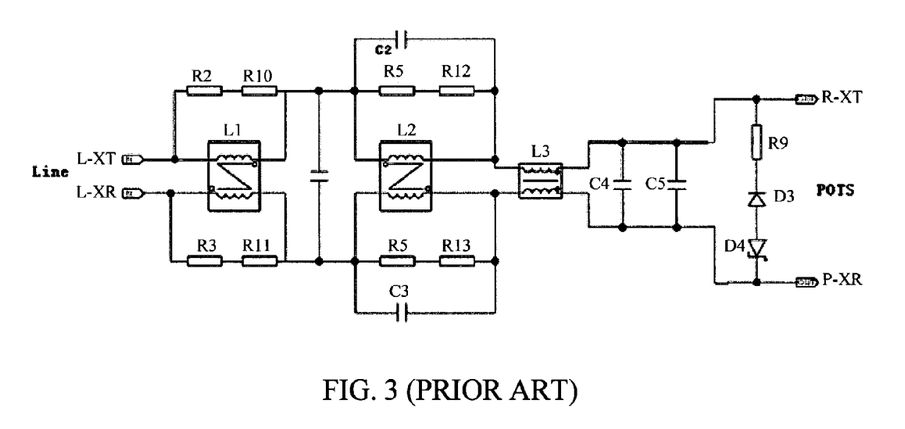
FIG. 3 is a first schematic structural diagram of a DSL protection circuit in the prior art.

A splitter of a DSL access device in the prior art is completely isolated and protected and no protection component is added to the splitter. For example, as shown in FIG. 3, the splitter includes: discrete inductance (L1, L2, L3) and capacitance component (C1, C2, C3, C4, C5), and the splitter uses a L3 inductance for filtering, in which the inductance L3 is used to suppress EMI (Election Magnetic Interference, election magnetic interference) common-mode induction. Ports of the splitter are completely isolated and protected. When P-XT or P-XR of the POTS at one end is short-circuited or to-ground short-circuited, horizontal surge voltage from the Line at the other end may be added to two ends of the splitter or high current passes the coil of the splitter due to contact, causing damage or on-fire to the splitter; reversely, when L-XT or L-XR of the Line at the other end is short-circuited or to-ground short-circuited, vertical surge voltage from the Line at the other end is added to two ends of the splitter or high current passes the coil of the splitter due to contact, also causing damage or on-fire to the splitter. In addition, the splitter as a discrete component has a large size, affecting density of a board.

Figure 4:
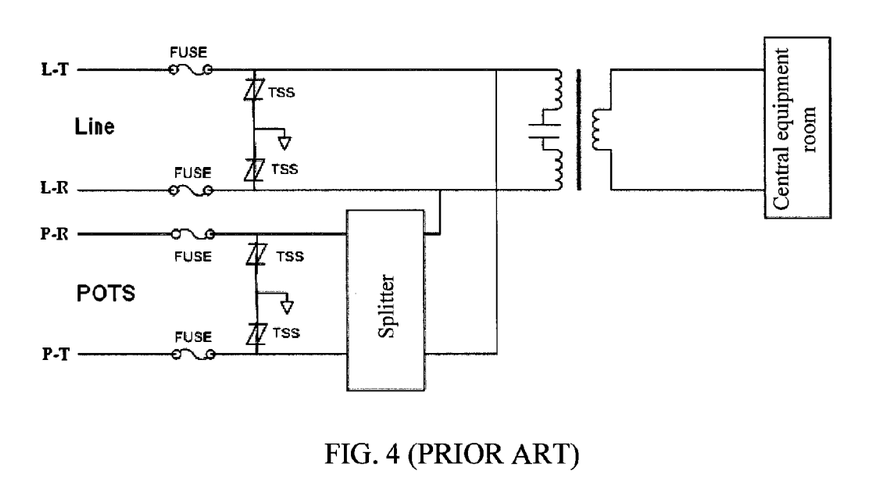
FIG. 4 is a second schematic structural diagram of a DSL protection circuit in the prior art.

POTS and Line ports of some xDSL devices in the prior art use the protection solution of the fuse (Fuse) plus the voltage-switch thyristor surge suppressor diode (Thyristor Surge Suppressor, shorted as TSS hereinafter), and the protection circuit is shown in FIG. 4. When T and R at one end of the circuit are short-circuit or to-ground short-circuited, as the loop resistance of the splitter is only about 20Ω, when the current passing the splitter is not high enough to reach the start voltage of the TSS, the TSS does not work and cannot protect the splitter. When horizontal or vertical power line from the other end contacts the current to pass the coil of the splitter, high current passes the splitter because even if the fuse exists, the maximum non-operating current of the fuse within 15 minutes is still high, for example, about 2 A, and the loop resistance of the splitter is about 20Ω, and the splitter is overheated after a long time and damage or fire results.

In the process of implementing the technical solutions of the present application, the splitter in the prior art has at least the following problem: The splitter is prone to be damaged when a two-wire short-circuit fault or grounding fault occurs on one end and lightning strike, power line induction, or contact occurs on the other end.

SUMMARY OF THE APPLICATION

The present application provides a DSL protection circuit to prevent a splitter from being damaged or getting on fire when a two-wire short-circuit fault or grounding fault occurs on one end of the splitter and lighting strike, power line induction or contact occurs on the other end.

A DSL protection circuit according to the present application provides

A DSL protection circuit, including: a DSL and POTS broadband and narrowband mixed signal port, a narrowband POTS port, and a splitter, the DSL and POTS broadband and narrowband mixed signal port is connected to the narrowband POTS port through the splitter, a restorable current-limited component for limiting abnormal current is cascaded with a line on which an input end or output end of the splitter is; the line on which the splitter and the restorable current-limited component are cascaded is connected in parallel with a voltage-limited component for bypass conduction of the splitter; an overcurrent fuse component is cascaded with a line on which the DSL and POTS broadband and narrowband mixed signal port is or a line on which the narrowband POTS port is.

On the DSL protection circuit provided in the embodiments of the present application, each line on which an input end or output end of the splitter is cascaded with a restorable current-limited component for limiting abnormal current, and the line on which the splitter and the current-limited component are cascaded is connected in parallel with a voltage-limited component for bypass of the splitter, and further, each line on which a DSL and POTS broadband and narrowband mixed signal port is or each line on which a narrowband POTS port is cascaded with an overcurrent fuse component. When a short-circuit fault or to-ground short-circuit fault occurs on a Line end or a POTS end and surge overvoltage occurs on the other end, the restorable current-limited component does not act and the voltage-limited component is enabled and protects the splitter; when the power line is faulty and overcurrent occurs, for overcurrent with high current and short duration, the current-limited component acts in a high impedance state to trigger the enabling of the voltage-limited component as bypass conduction, so as to provide overcurrent protection for the splitter; for overcurrent with high current and long duration, the current-limited component acts in a high impedance state, to trigger the enabling of the voltage-limited component, and then the voltage-limited component is overheated and performs FS action to implement bypass of the overcurrent, to prevent on-fire or explosion of the voltage-limited component; for overcurrent with very high current, the overcurrent fuse component fuses and becomes open-circuited, to prevent on-fire or other security problems of the device. In all, the technical solutions implement current limit and voltage limit on the splitter, thereby protecting the splitter from being damaged or getting on fire.

BRIEF DESCRIPTION OF THE DRAWINGS

To describe the technical solutions according to the embodiments of the present application or in the prior art more clearly, the accompanying drawings for describing the embodiments are outlined below. Apparently, the accompanying drawings in the following description are merely about some embodiments of the present application, and persons skilled in the art can obtain other drawings based on these drawings without creative efforts.

DETAILED DESCRIPTION OF THE EMBODIMENTS

The technical solutions according to the embodiments of the present application are described clearly and completely below with reference to the accompanying drawings of the embodiments of the present application. It is apparent that the embodiments to be described are only a part rather than all of the embodiments of the present application, and all other embodiments obtained by those skilled in the art without creative efforts based on the embodiments of the present application shall fall within the protection scope of the present application.

The present application provides a DSL protection circuit to prevent a splitter from being damaged or getting on fire when a two-wire short-circuit fault or grounding fault occurs on one end of the splitter and lighting strike, power line induction or contact occurs on the other end.

Embodiment 1

Figure 5:
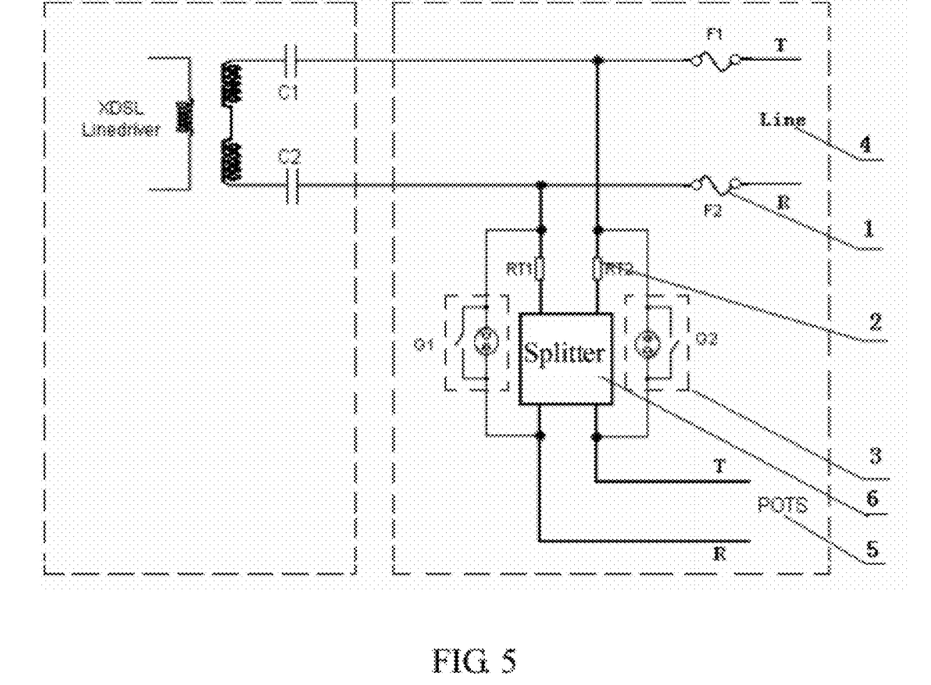
FIG. 5 is a schematic structural diagram of a DSL protection circuit according to Embodiment 1 and Embodiment 2 of the present application.

The embodiment of the present application provides a DSL protection circuit, as shown in FIG. 5. The DSL protection circuit includes: a DSL and POTS broadband and narrowband mixed signal port 4, a narrowband POTS port 5, and a splitter 6, where the DSL and POTS broadband and narrowband mixed signal port 4 is connected to the narrowband POTS port 5 through the splitter 6, and a line on which an input end or output end of the splitter is cascaded with a restorable current-limited component 2 for limiting abnormal current; the line on which the splitter 6 and the restorable current-limited component 2 are cascaded is connected in parallel with a voltage-limited component 3 for bypass of the splitter 6; a line on which the DSL and POTS broadband and narrowband mixed signal port 4 is or a line on which the narrowband POTS port 5 is cascaded with an overcurrent fuse component 1.

The restorable current-limited component 2 according to the embodiment of the present application is a component that can limit abnormal current, for example, a thermistor; the voltage-limited component 3 is a component for bypass of the splitter 6, for example, a gas discharge tube (Gas Discharge Tube, shorted as GDT); the current fuse component 1 is a security component that fuses when overcurrent occurs, for example, a fuse. It should be noted that any components that have the above functions may replace the components provided in the embodiment of the present application.

The following takes an example that the restorable current-limited component 2 is a thermistor, the voltage-limited component 3 is a gas discharge tub, and the current fuse component 1 is a fuse, to describe the principle of circuit protection according to the embodiment of the present application.

As shown in FIG. 5, when a short-circuit or to-ground short-circuit fault occurs on T and R of a Line end 4, and overvoltage and overcurrent occurs on a POTS end due to surge, power line induction or contact: 1) When overvoltage occurs due to surge, thermistors RT1 and RT2 do not act, but gas discharge tubes G1 and G2 are enabled and protect the splitter because of resistance and induction effects of a coil in the splitter 6; 2) When overcurrent occurs due to the fault of a power line, for overcurrent with high current and short duration, the thermistors RT1 and RT2 act in a high impedance state to trigger the enabling of the gas discharge tubes G1 and G2, so as to provide the overcurrent protection for the splitter 6; for overcurrent with high current and long duration, the thermistors RT1 and RT2 act in a high impedance state to trigger the enabling of the gas discharge tubes G1 and G2, and then the gas discharge tubes G1 and G2 are overheated and perform FS action to implement bypass of the overcurrent, to prevent on-fire or explosion of the gas discharge tubes G1 and G2; for overcurrent with very high current, fuses F1 and F2 fuse and become open-circuited, thereby preventing the device from getting on fire or other security problems. Reversely, when a short-circuit or to-ground short-circuit fault occurs on T and R of the POTS end, and overvoltage and overcurrent occur on the other end, the Line end, due to surge, power line induction or contact, the principle of the circuit protection is similar.

On the DSL protection circuit provided in the embodiment of the present application, each line on which an input end or output end of the splitter is cascaded with a restorable current-limited component for limiting abnormal current, and the line on which the splitter and the current-limited component are cascaded is connected in parallel with a voltage-limited component for bypass of the splitter, and further, each line on which a DSL and POTS broadband and narrowband mixed signal port is or each line on which a narrowband POTS port is cascaded with an overcurrent fuse component. When a short-circuit fault or to-ground short-circuit fault occurs on a Line end or a POTS end and surge overvoltage occurs on the other end, the restorable current-limited component does not act and the voltage-limited component is enabled and protects the splitter; when the power line is faulty and overcurrent occurs, for overcurrent with high current and short duration, the current-limited component acts in a high impedance state to trigger the enabling of the voltage-limited component, so as to provide overcurrent protection for the splitter; for overcurrent with high current and long duration, the current-limited component acts in a high impedance state, to trigger the enabling of the voltage-limited component, and then, the voltage-limited component is overheated and performs FS action to implement bypass of the overcurrent, to prevent on-fire or explosion of the voltage-limited component; for overcurrent with very high current, the overcurrent fuse component fuses and becomes open-circuited, to prevent the device from on-fire or other security problems. In all, the technical solution can implement current limit and voltage limit on the splitter, thereby protecting the splitter from being damaged or getting on fire.

Embodiment 2

Based on Embodiment 1, specifically, the DSL protection circuit provided in the embodiment of the present application includes: a DSL and POTS broadband and narrowband mixed signal port (line end 4: DSL and POTS mixed signal port), a narrowband POTS port (POTS end 5), and a splitter 6. The DSL and POTS broadband and narrowband mixed signal port is connected to the narrowband POTS port through the splitter 6. An input end of the splitter 6, that is, the end connected to the line end 4 is cascaded with thermistors RT1 and RT2, and a gas discharge tube G1 is connected in parallel with a line on which the splitter 6 is cascaded with the thermistor RT1, and a gas discharge tube G2 is connected in parallel with a line on which the splitter 6 is cascaded with the thermistor RT2; an end of the narrowband POTS port, that is, the end where the splitter is connected to the line end 4 is cascaded with fuses F1 and F2.

In this embodiment, G1 and G2 are two-electrode gas discharge tubes with the Fail-Safe (FS) function.

In the above circuit, the structure and parameter of each component are set as follows:
1) RT1 and RT2: thermistor (PTC). The static resistance is less than 5Ω In normal temperature, the non-operating current is larger than 0.3 A, and when the operating current is 0.5 A in normal temperature, the operation time is larger than 30 s;
2) G1 and G2: two-electrode gas discharge tubes (GDT) with the FS function. The direct current breakdown voltage is not larger than 300 V, and the joint capacitance is smaller than 2 pF. The FS function is a fail-safe protection function, that is, when the GDT is enabled for a long time and becomes overheated, the FS is started and reliably short-circuits two poles of the GDT, to ensure the safe failure of the GDT.

Figure 6:
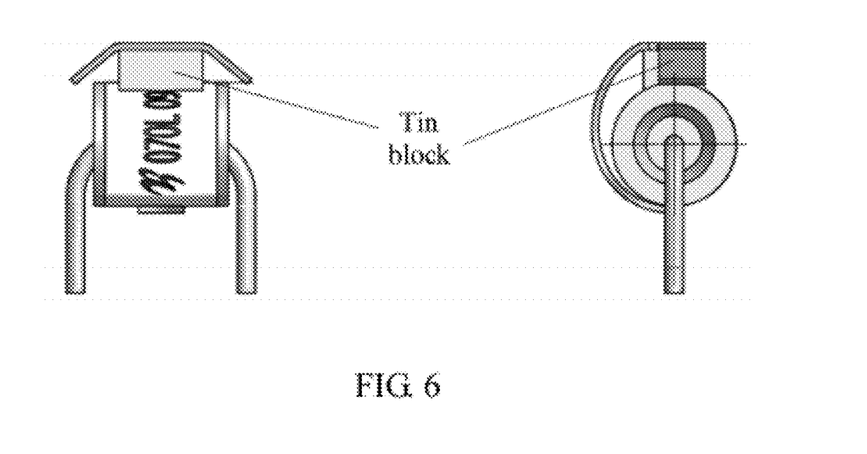
FIG. 6 is a first schematic structural diagram of a two-electrode GDT with FS according to an embodiment of the present application.

FIG. 6 shows a structure of a two-electrode GDT with FS, where the FS is in "tin block+spring plate" structure.

Figure 7:
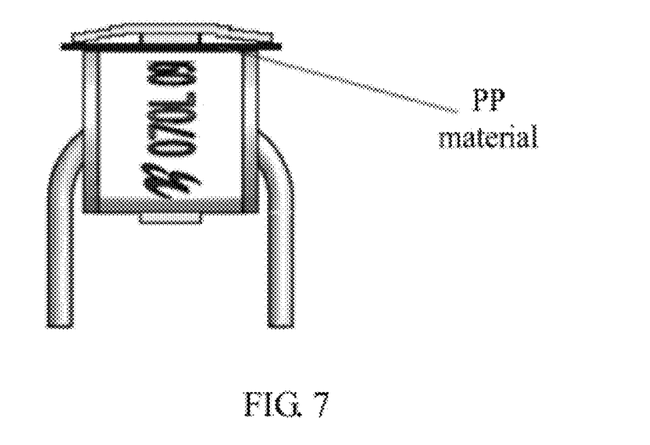
FIG. 7 is a second schematic structural diagram of a two-electrode GDT with FS according to an embodiment of the present application.
Figure 8:
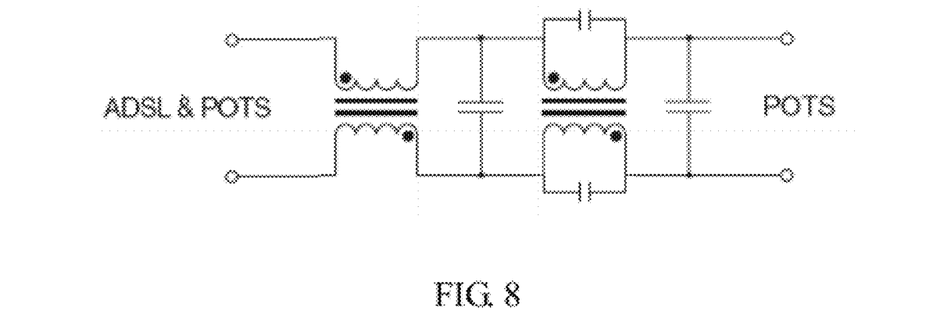
FIG. 8 is a schematic structural diagram of a splitter with two-class filter according to an embodiment of the present application.
Figure 9:
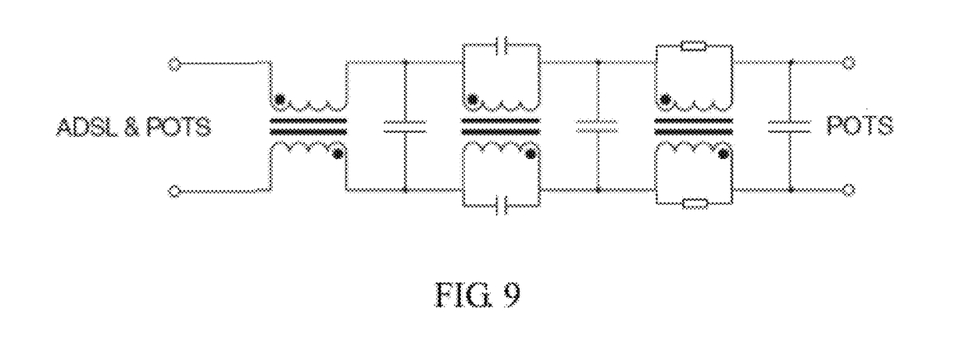
FIG. 9 is a schematic structural diagram of a splitter with three-class filter according to an embodiment of the present application.

FIG. 7 shows a structure of another two-electrode GDT with FS, where the FS is in "polymer material+spring plate" structure. The FS function is described as follows: When the GDT is enabled and high current passes for a long time, the arc light discharge of the GDT generates a large amount of heat to fuse the tin block or polymer material, and then the metal spring plate reliably short-circuits two poles of the GDT, to ensure the safe failure of the GDT and prevent a fire accident.
3) F1 and F2: fuse (Fuse). The rated working current is 1.25 A to 2.5 A. When the alternating current of 2.2 A passes, the fuse time is less than 15 minutes.
4) Splitter 6: splitter 6 (Splitter). The splitter is a bandpass filter formed by inductors and capacitors. As the coil winding of a inductor, the direct current resistance at each side is generally about 10Ω. The function of the splitter 6 is to split the narrowband POTS signal from the DSL+POTS mixed signal at the line end and isolate the broadband DSL signal; from another aspect, the splitter 6 combines a narrowband POTS signal and a broadband DSL signal into a mixed signal and transports the combined signal through a Line wire. For an example of a structure of the splitter, FIG. 8 is a schematic structural diagram of a splitter with two-class filter, and FIG. 9 is a schematic structural diagram of a splitter with three-class filter.

The principle of circuit protection according to this embodiment of the present application is as follows:

As shown in FIG. 5, when a short-circuit or to-ground short-circuit fault occurs on T and R of a Line end 4, and overvoltage and overcurrent occurs on a POTS end 5 due to surge, power line induction or contact: 1) When overvoltage occurs due to surge, thermistors RT1 and RT2 do not act, but gas discharge tubes G1 and G2 are enabled and protect the splitter 6 because of resistance and induction effects of a coil in the splitter 6; 2) When overcurrent occurs due to the fault of a power line, for overcurrent with high current and short duration, the thermistors RT1 and RT2 act in a high impedance state to trigger the enabling of the gas discharge tubes G1 and G2, to provide overcurrent protection for the splitter 6, but the FS in the GDT does not act, to ensure that the GDT restores normal after the overcurrent disappears; for overcurrent with high current and long duration, the thermistors RT1 and RT2 act in a high impedance state to trigger the enabling of the gas discharge tubes G1 and G2, and then the gas discharge tubes G1 and G2 are overheated and perform FS action to implement the bypass of the overcurrent, to prevent the GDT from on-fire or explosion; for overcurrent with very high current, fuses F1 and F2 fuse and become open-circuited, thereby preventing the device from being getting on fire or other security problems. Reversely, when a short-circuit or to-ground short-circuit fault occurs on T and R of the POTS end 5, and overvoltage and overcurrent occur on the Line end 4 due to surge, power line induction or contact, the principle of circuit protection is similar, and details are not described herein again.

The above circuit may be used to protect VDSL2 and ADSL2+ interfaces with a splitter.

On the DSL protection circuit according to the embodiment of the present application, the input end of the splitter is cascaded with the thermistors RT1 and RT2, and a two-electrode gas discharge tube with the fail-safe function (FS) is connected in parallel with a line on which the splitter is cascaded with the thermistor RT1, and a two-electrode gas discharge tube with the fail-safe function (FS) is connected in parallel with a line on which the splitter is cascaded with the thermistor RT2; and further, a line on which a broadband and narrowband mixed signal port is cascaded with fuses F1 and F2. When a short-circuit or to-ground short-circuit fault occurs on a Line end or a POTS end, and overvoltage and overcurrent occurs on the other end due to surge, power line induction or contact, the gas discharge tubes G1 and G2 can be enabled for bypass; and further, for overcurrent with very high current, the fuses F1 and F2 fuse and become open-circuited, to prevent the device from on-fire or other security problems and protect the splitter from being damaged or getting on fire. Further, the circuit may adopt a modular splitter with a small size, and in this way, high subscriber density may be implemented on a small PCB area.

Embodiment 3

Figure 10:
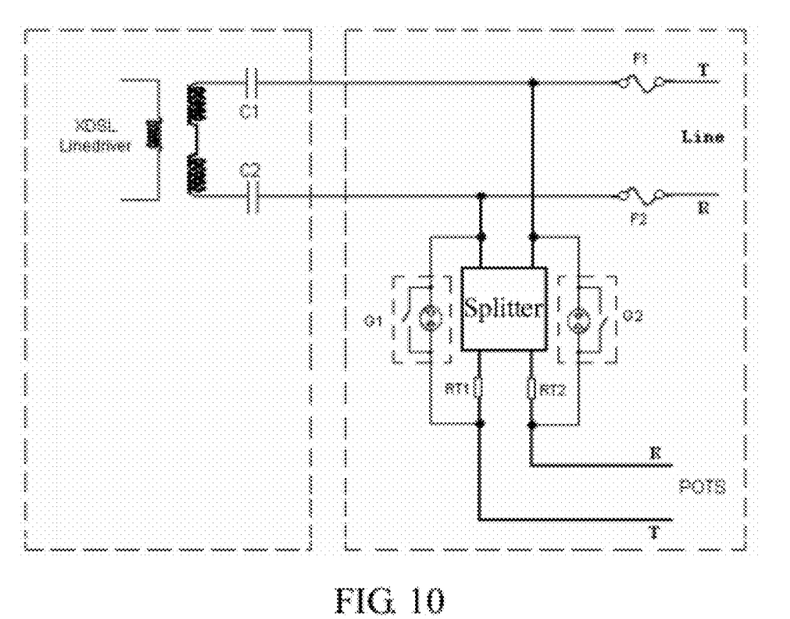
FIG. 10 is a schematic structural diagram of a DSL protection circuit according to Embodiment 3 of the present application.

A DSL protection circuit provided in the embodiment application has a basically similar circuit structure as the circuit according to Embodiment 2. As shown in FIG. 10, the difference lies in that the thermistors RT1 and RT2 are cascaded on a side where the splitter is connected to the POTS end.

The protection principle of the DSL protection circuit provided in the embodiment application is similar to the protection principle of the circuit according to Embodiment 2, and details are not described herein again.

Embodiment 4

Figure 11:
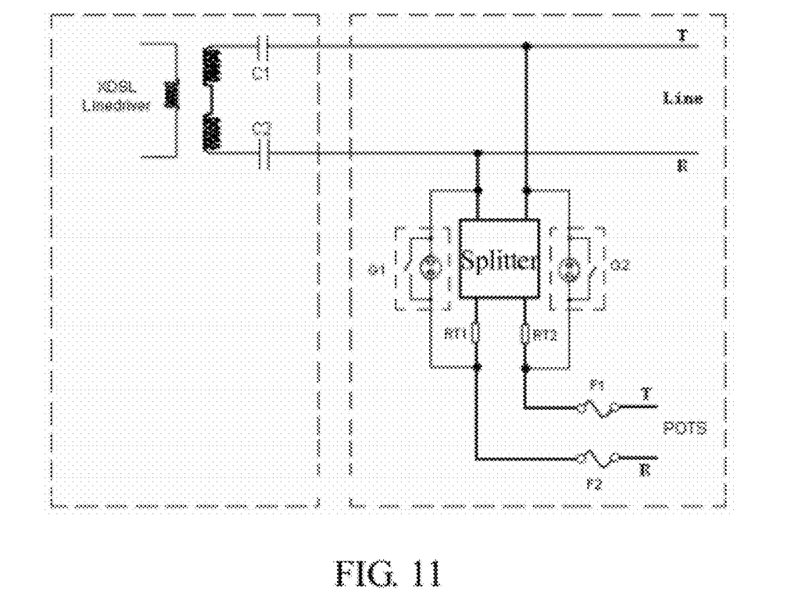
FIG. 11 is a schematic structural diagram of a DSL protection circuit according to Embodiment 4 of the present application.

A DSL protection circuit provided in the embodiment application has a basically similar structure as the circuit according to Embodiment 2. As shown in FIG. 11, the difference lies in that the fuses F1 and F2 are cascaded on a side where the splitter is connected to the POTS end.

The protection principle of the DSL protection circuit provided in the embodiment application is similar to the protection principle of the circuit according to Embodiment 2, and details are not described herein again.

Embodiment 5

Figure 12:
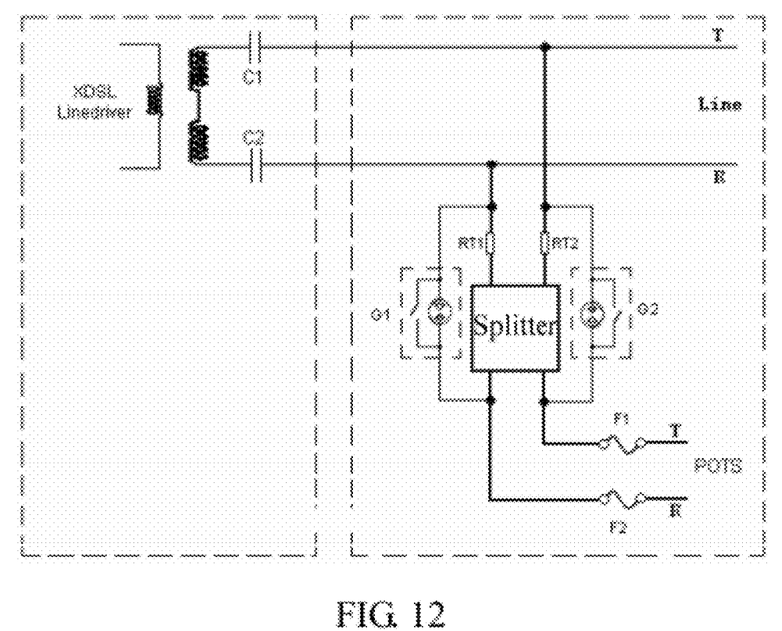
FIG. 12 is a schematic structural diagram of a DSL protection circuit according to Embodiment 5 of the present application.

A DSL protection circuit provided in the embodiment application has a basically similar structure as the circuit according to Embodiment 2. As shown in FIG. 12, the difference lies in that the thermistors RT1 and RT2 are cascaded on a side where the splitter is connected to the Line end.

The protection principle of the DSL protection circuit provided in the embodiment application is similar to the protection principle of the circuit according to Embodiment 2, and details are not described herein again.

Embodiment 6

Figure 13:
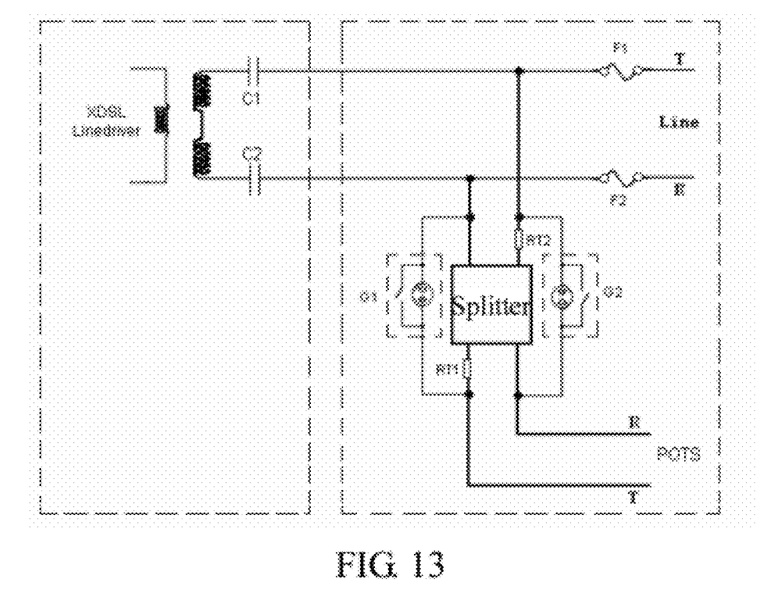
FIG. 13 is a schematic structural diagram of a DSL protection circuit according to Embodiment 6 of the present application.

A DSL protection circuit provided in the embodiment application has a basically similar structure as the circuit according to Embodiment 2. As shown in FIG. 13, the difference lies in that the thermistor RT1 is cascaded on a side where the splitter is connected to the POTS end and the thermistor RT2 is cascaded on another side where the splitter is connected to the Line end.

The protection principle of the DSL protection circuit provided in the embodiment application is similar to the protection principle of the circuit according to Embodiment 2, and details are not described herein again.

Embodiment 7

Figure 14:
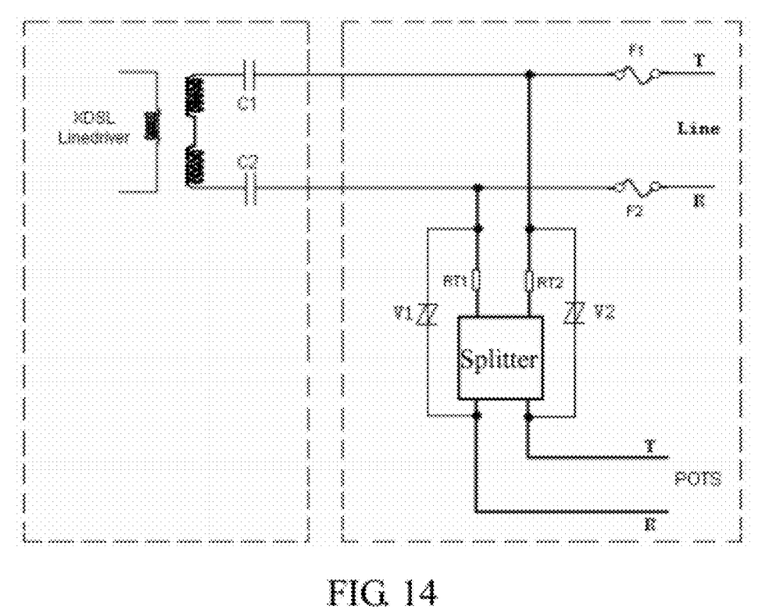
FIG. 14 is a schematic structural diagram of a DSL protection circuit according to Embodiment 7 of the present application.

The DSL protection circuit provided in the embodiment application has a basically similar structure as the circuit according to Embodiment 2. As shown in FIG. 14, the difference lies in that a voltage-switch thyristor surge suppressor (Thyristor Surge Suppressor, shorted as TSS hereinafter) diodes V1 and V2 replace two-electrode GDTs G1 and G2 with FS. As for the working principle, for overcurrent with high current and long duration, RT1 and RT2 act in a high impedance state to trigger the enabling of V1 and V2, the TSS tube has a powerful capacity for bypass of the overcurrent, and the on-fire or explosion phenomena will not occur. The principle is similar to the principle of the circuit protection according to Embodiment 1, and details are not described herein again.

Embodiment 8

Figure 15:
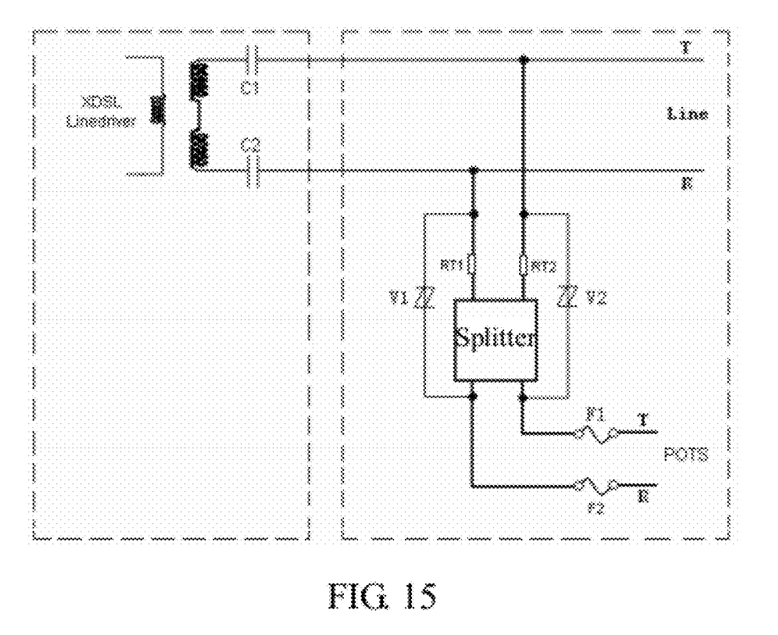
FIG. 15 is a schematic structural diagram of a DSL protection circuit according to Embodiment 8 of the present application.

A DSL protection circuit provided in the embodiment application has a basically similar structure as the circuit according to Embodiment 7. As shown in FIG. 15, the difference lies in that the fuses F1 and F2 are cascaded on a side where the splitter is connected to the POTS end.

The protection principle of the DSL protection circuit provided in the embodiment application is similar to the protection principle of the circuit according to Embodiment 2, and details are not described herein again.

On the DSL protection circuit provided in the embodiment of the present application, each line on which an input end or output end of the splitter is cascaded with thermistors RT1 and RT2, and a two-electrode gas discharge tube with the fail-safe function (FS) or a voltage-switch thyristor surge suppressor diode is connected in parallel with a line on which the splitter is cascaded with the thermistor RT1, and a two-electrode gas discharge tube with the fail-safe function (FS) or a voltage-switch thyristor surge suppressor diode is connected in parallel with a line on which the splitter is cascaded with the thermistor RT2; and further, a line connected to a POTS end is cascaded with fuses F1 and F2. When a short-circuit or to-ground short-circuit fault occurs on a Line end or a POTS end, and overvoltage and overcurrent occurs on the other end due to surge, power line induction or contact, current limit and voltage limit on the splitter can be implemented. Further, for overcurrent with very high current, the fuses F1 and F2 fuse and become open-circuited, to prevent the device from on-fire or security problems and prevent the splitter from being damaged or getting on fire. Further, the circuit may be a modular splitter with a small size, and in this way, high subscriber density may be implemented on a small PCB area.

The steps in the method or algorithm described in the embodiments of the present application may be implemented by hardware, software module executed by the processor, or may be implemented by the combination of the hardware and the software module. The software module may be set in a random access memory (RAM), read only memory (ROM), electrically programmable ROM, electrically erasable programmable ROM, register, hard disk, movable disk, CD-ROM, or storage medium of any other form known in the technical field.

The above description is only about the exemplary embodiments of the present application. However, the protection scope of the present application is not limited thereto. Variations or replacements easily derived by those skilled in the art within the technical scope disclosed by the present application application should fall within the protection scope of the present application. Therefore, the protection scope of the present application is defined by the appended claims.

The invention claimed is:

1. A Digital Subscriber Line (DSL) protection circuit, comprising:
   a DSL and Plain Old Telephone Service (POTS) broadband and narrowband mixed signal port;
   a narrowband POTS port; and
   a splitter,
   wherein the DSL and POTS broadband and narrowband mixed signal port is connected to the narrowband POTS port through the splitter,
   wherein a restorable current-limited component for limiting abnormal current is cascaded with a line containing an input end or an output end of the splitter,
   wherein the line on which the splitter and the restorable current-limited component are cascaded is connected in parallel with a voltage-limited component for bypass conduction of the splitter, and
   wherein an overcurrent fuse component is cascaded with a line containing the DSL and POTS broadband and narrowband mixed signal port or a line containing the narrowband POTS port.

2. The circuit according to claim 1, wherein the restorable current-limited component comprises a thermistor.

3. The circuit according to claim 1, wherein the voltage-limited component comprises a gas discharge tube.

4. The circuit according to claim 3, wherein the gas discharge tube comprises a two-electrode gas discharge tube with a fail-safe function.

5. The circuit according to claim 1, wherein the voltage-limited component comprises a voltage-switch thyristor surge suppressor diode.

6. The circuit according to claim 4, wherein direct current breakdown voltage of the two-electrode gas discharge tube is not larger than 300 volts (V) and joint capacitance is smaller than 2 picofarads (pF).

7. The circuit according to claim 2, wherein static resistance of the thermistor is smaller than 5 ohms ($\Omega$), wherein non-operating current in normal temperature is larger than 0.3 amperes (A), and wherein operating time is larger than 30 seconds (s) when operating current in normal temperature is 0.5 A.

8. The circuit according to claim 1, wherein the overcurrent fuse component comprises a fuse.

9. The circuit according to claim 8, wherein rated working current of the fuse is 1.25 A to 2.5 A, and wherein fuse time is smaller than 15 minutes when the fuse is subjected to an alternating current of 2.2 A.

10. A Digital Subscriber Line (DSL) protection circuit, comprising:
    a DSL and Plain Old Telephone Service (POTS) broadband and narrowband mixed signal port;
    a narrowband POTS port; and
    a splitter,
    wherein the DSL and POTS broadband and narrowband mixed signal port is connected to the narrowband POTS port through the splitter,
    wherein a restorable current-limited component for limiting abnormal current is connected in series to an input end or an output end of the splitter,
    wherein a line on which the splitter and the restorable current-limited component are connected is connected in parallel with a voltage-limited component for bypass conduction of the splitter, and
    wherein an overcurrent fuse component is connected in series with a line containing the DSL and POTS broadband and narrowband mixed signal port or a line containing the narrowband POTS port.

11. The circuit according to claim 10, wherein the restorable current-limited component is connected in series to the input end of the splitter.

12. The circuit according to claim 10, wherein the restorable current-limited component is connected in series to the output end of the splitter.

13. The circuit according to claim 10, further comprising a second voltage-limited component for bypass conduction of the splitter.

14. The circuit according to claim 10, wherein the overcurrent fuse is connected in series with the line containing the narrowband POTS port.

15. The circuit according to claim 10, wherein the voltage-limited component comprises a diode.

16. A Digital Subscriber Line (DSL) protection circuit, comprising:
    a DSL and Plain Old Telephone Service (POTS) broadband and narrowband mixed signal port;
    a narrowband POTS port; and
    a splitter,
    wherein the DSL and POTS broadband and narrowband mixed signal port is connected to the narrowband POTS port through the splitter,
    wherein a thermistor for limiting abnormal current is connected in series to an input end or an output end of the splitter,
    wherein a line on which the splitter and the thermistor are connected is connected in parallel with a gas discharge tube for bypass conduction of the splitter, and
    wherein an overcurrent fuse component is connected in series with a line containing the DSL and POTS broadband and narrowband mixed signal port or a line containing the narrowband POTS port.

17. The circuit according to claim 16, wherein the thermistor acts in a high impedance state to trigger the gas discharge tube to provide overcurrent protection to the splitter.

18. The circuit according to claim 16, wherein the gas discharge tube comprises a tin block and spring plate structure.

19. The circuit according to claim 16, wherein the gas discharge tube comprises a polymer material and spring plate structure.

20. The circuit according to claim 16, further comprising a second thermistor, a second gas discharge tube, and a second overcurrent fuse component.

* * * * *

UNITED STATES PATENT AND TRADEMARK OFFICE
CERTIFICATE OF CORRECTION

PATENT NO.        : 8,625,246 B2                                              Page 1 of 1
APPLICATION NO.   : 13/435821
DATED             : January 7, 2014
INVENTOR(S)       : Pingfang Yu et al.

It is certified that error appears in the above-identified patent and that said Letters Patent is hereby corrected as shown below:

Title Page, (57) Abstract, should read:

The embodiments of the present application provide a DSL protection circuit, including: a DSL and POTS broadband and narrowband mixed signal port, a narrowband POTS port, and a splitter, where the DSL and POTS broadband and narrowband mixed signal port is connected to the narrowband POTS port through the splitter, and a line on which an input end or output end of the splitter is cascaded with a restorable current-limited component for limiting abnormal current; a line on which the splitter and the restorable current-limited component are cascaded is connected in parallel with a voltage-limited component for bypass conduction of the splitter; a line on which the DSL and POTS broadband and narrowband mixed signal port or a line on which the narrowband POTS port is cascaded with an overcurrent fuse component.

Signed and Sealed this
Twenty-ninth Day of April, 2014

Michelle K. Lee
*Deputy Director of the United States Patent and Trademark Office*